Dec. 6, 1932.  P. ISRAELSON  1,890,155
POTATO PLANTER
Filed April 23, 1930    8 Sheets-Sheet 6
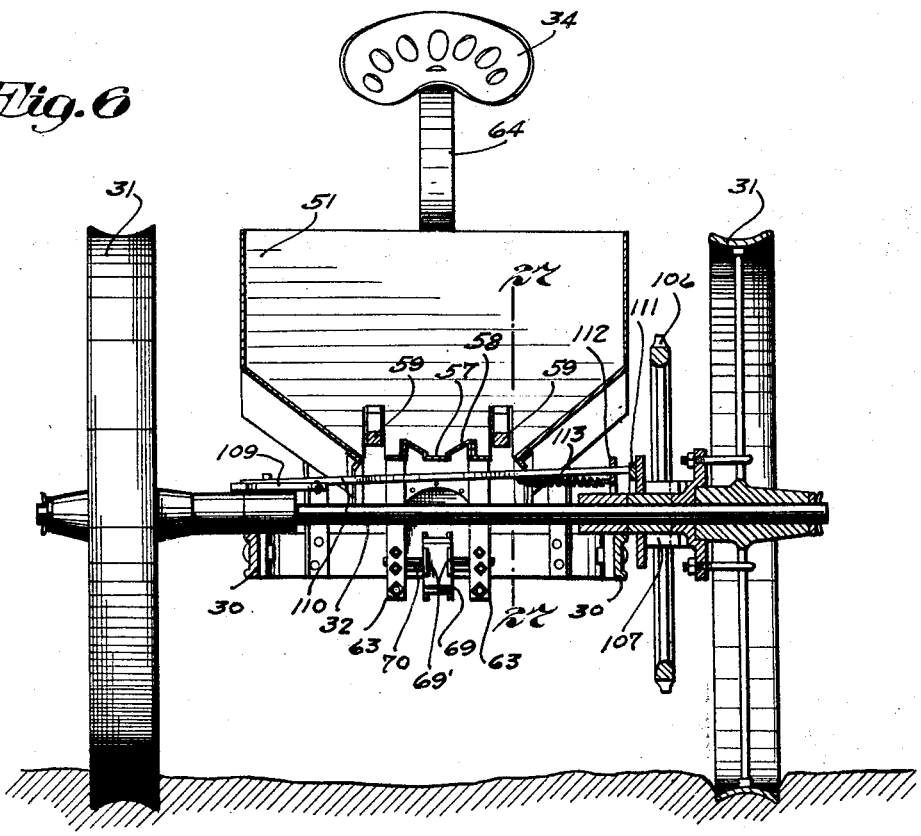
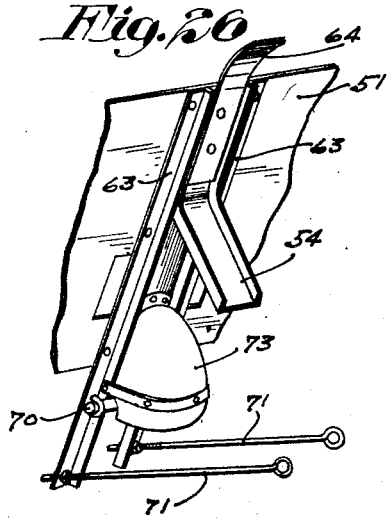
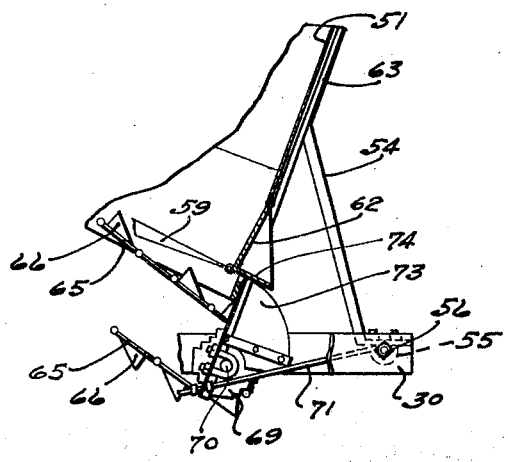
Inventor
Peder Israelson
By his Attorneys

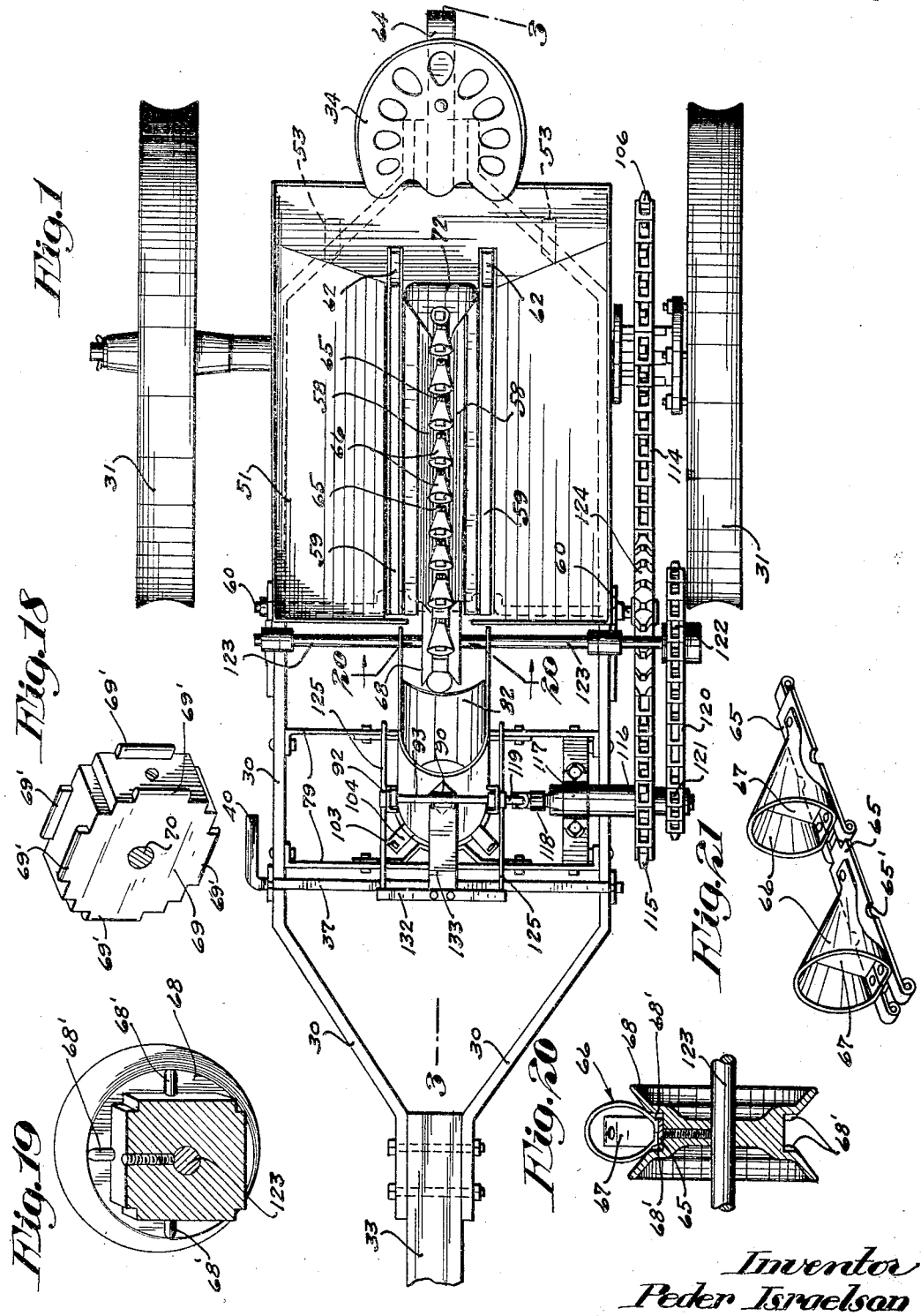

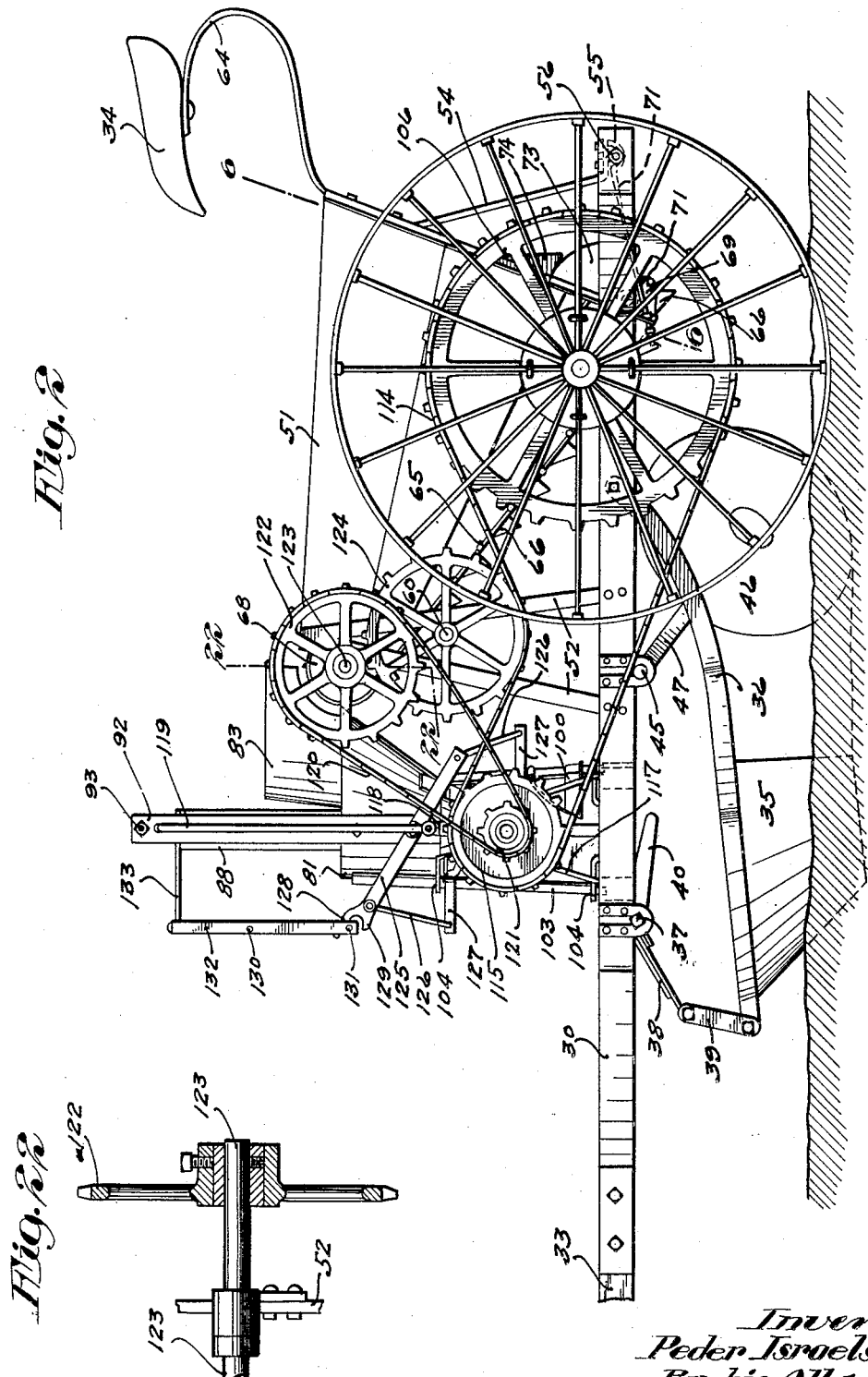

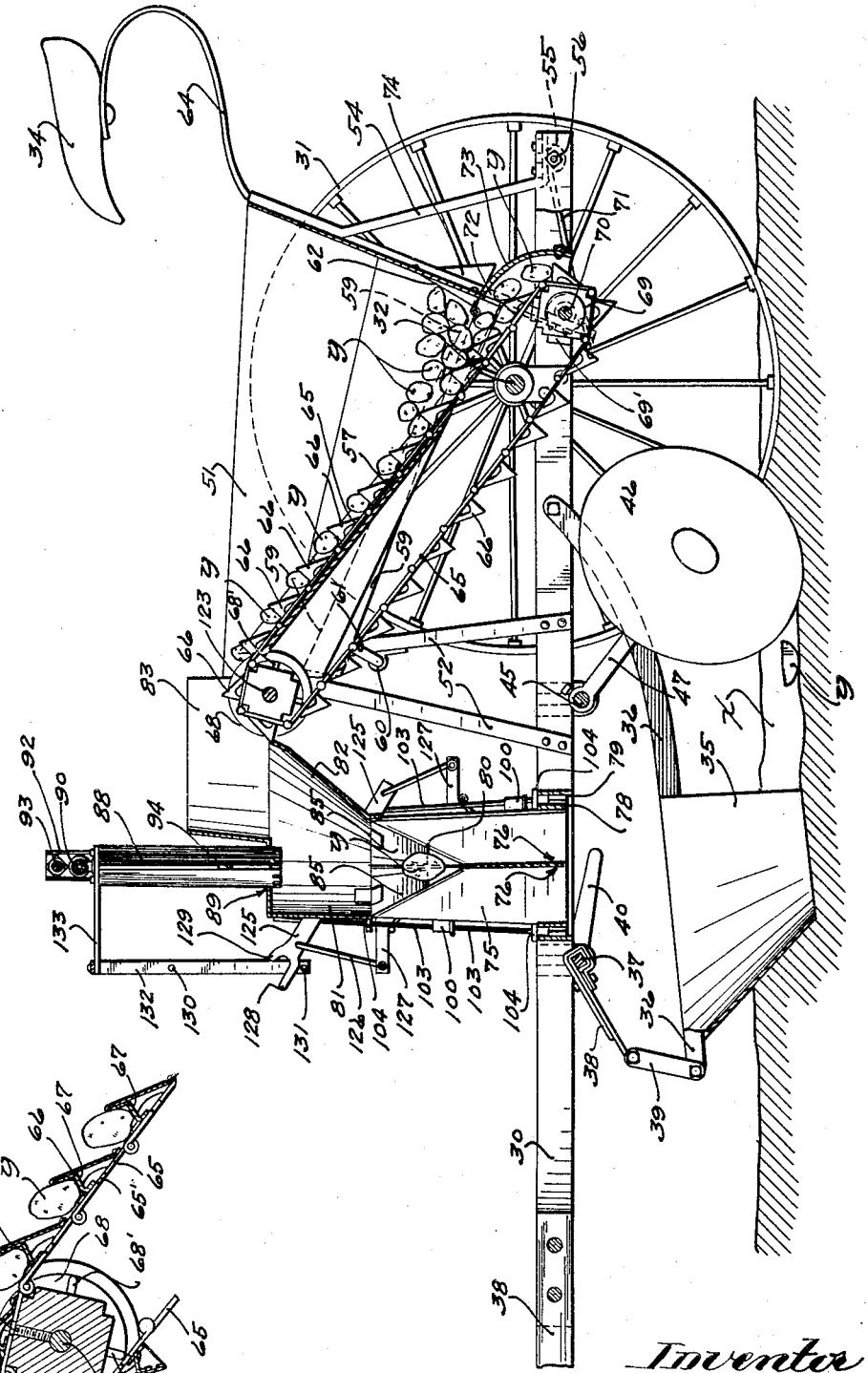

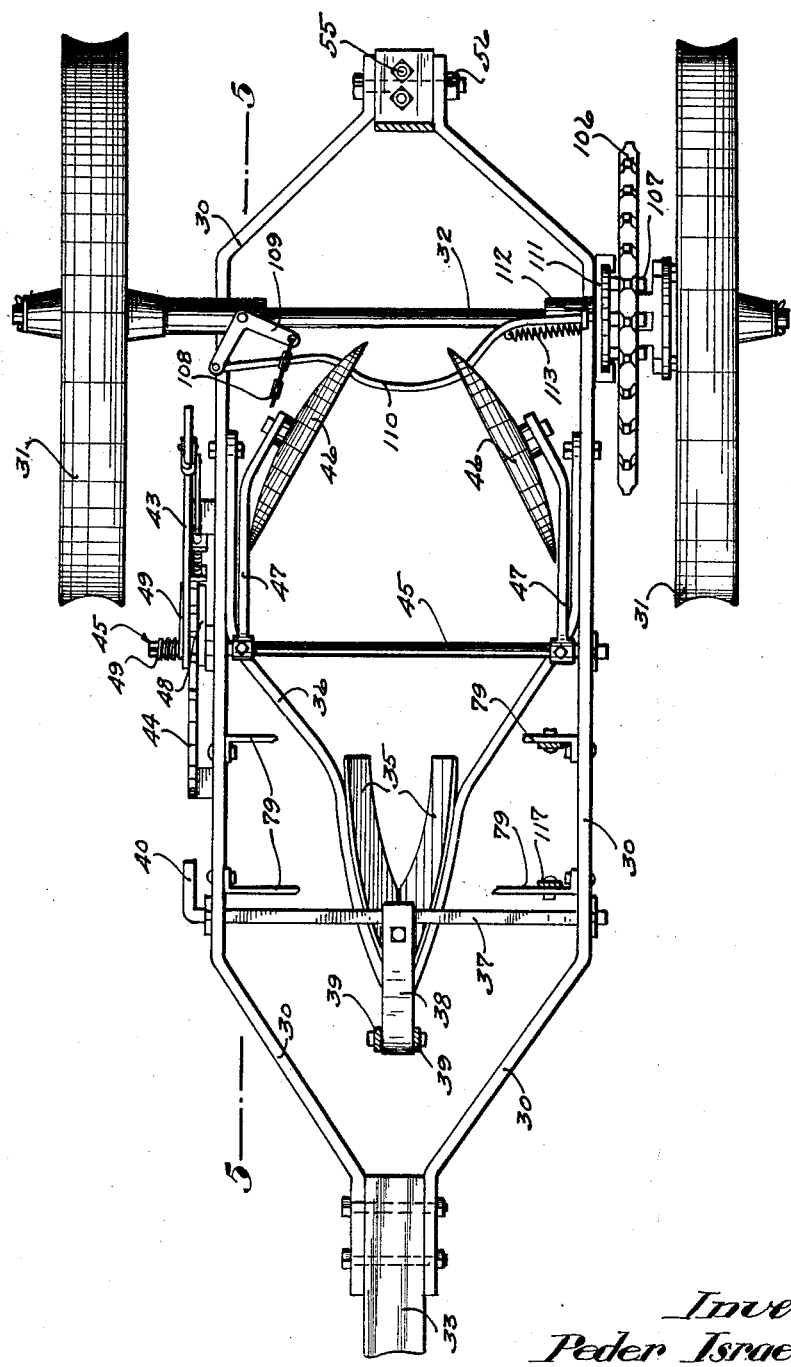

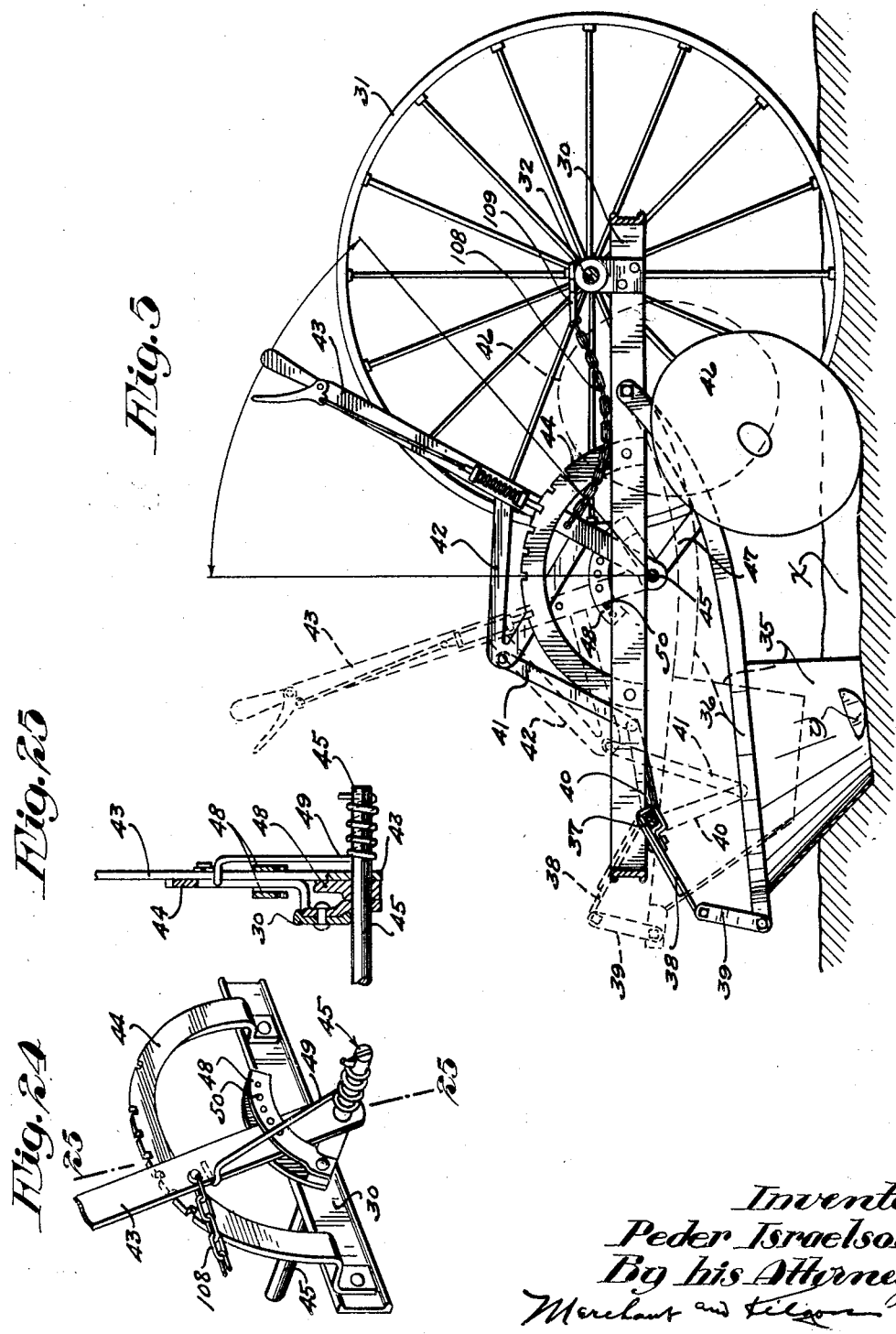

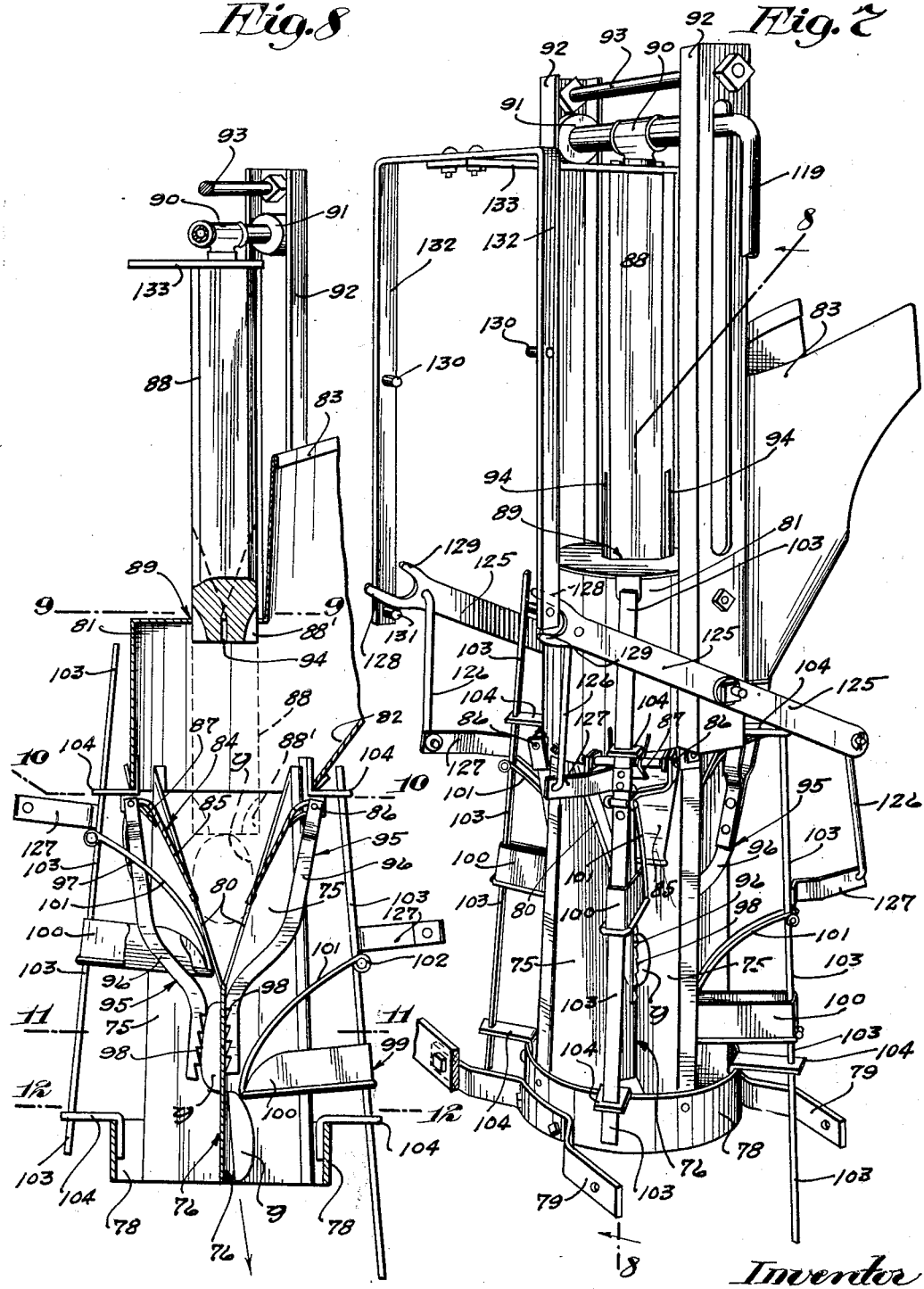

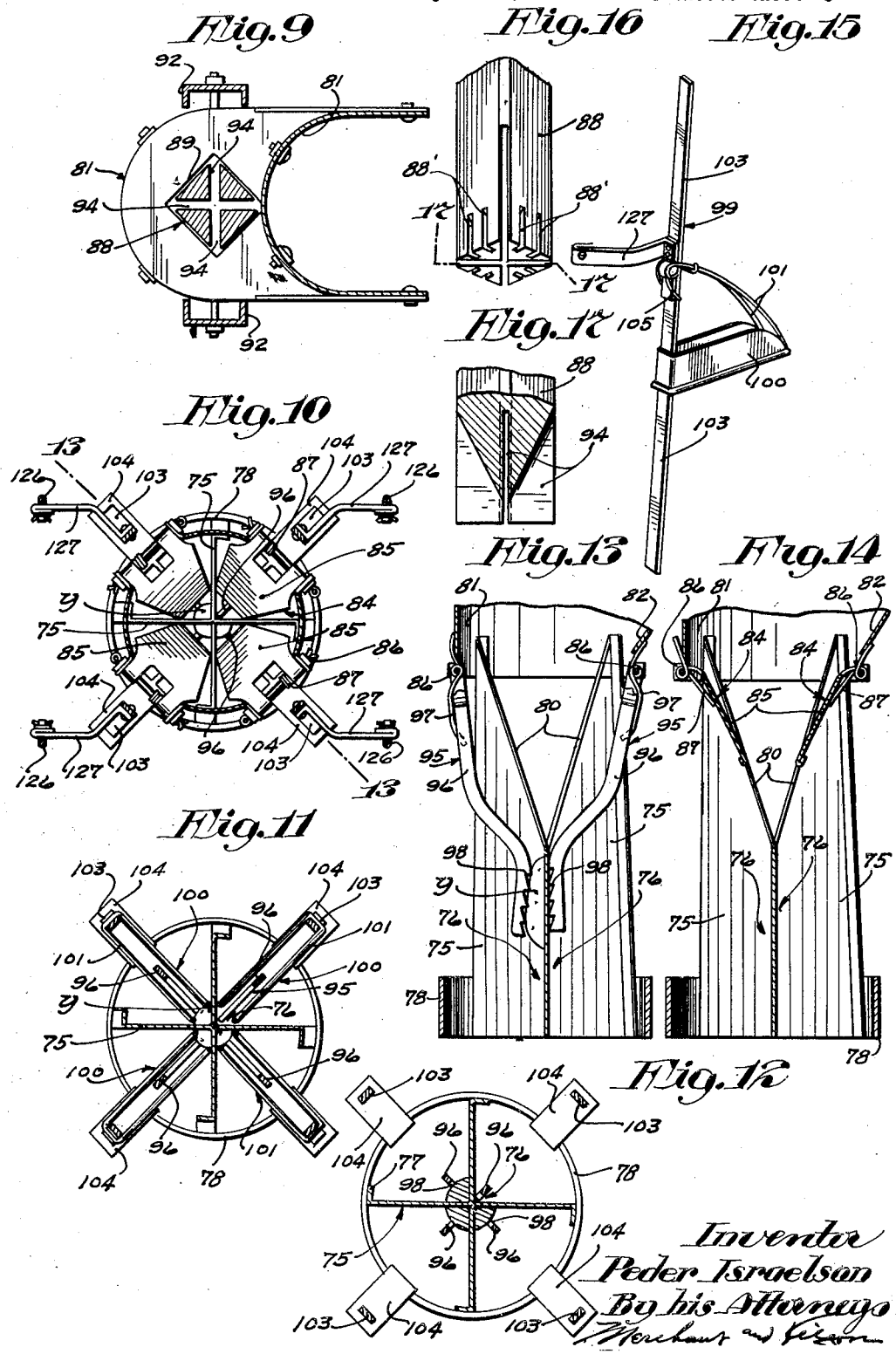

Patented Dec. 6, 1932

1,890,155

UNITED STATES PATENT OFFICE

PEDER ISRAELSON, OF HILLMAN, MINNESOTA

POTATO PLANTER

Application filed April 23, 1930. Serial No. 446,544.

This invention relates to potato planters and has for its object to provide a highly efficient potato planter that is positive and rapid in its action whereby, the planter may be drawn or propelled by a tractor or the like at a materially increased speed over that of a horse drawn planter.

To the above end, generally stated, the invention consists of the novel devices and combinations of devices hereinafter described and defined in the claims.

In the accompanying drawings, which illustrate the invention, like characters indicate like parts throughout the several views.
Referring to the drawings:

Fig. 1 is a plan view of the potato planter, with some parts removed;

Fig. 2 is a left side elevation of the same, with some parts removed;
Fig. 3 is a section taken on the line 3—3 of Fig. 1, with some parts removed;

Fig. 4 is a view corresponding to Fig. 1 with the exception that the upper portion of the planter has been removed;
Fig. 5 is a section taken on the line 5—5 of Fig. 4, with some parts shown in different positions by means of dotted lines;

Fig. 6 is a view partly in elevation and partly in transverse vertical section taken approximately on the line 6—6 of Fig. 2;

Fig. 7 is a perspective view of the cutting and ejecting head removed from the planter, on an enlarged scale;

Fig. 8 is a view partly in elevation and partly in section taken on the line 8—8 of Fig. 7 with some parts removed;

Figs. 9 to 12, inclusive, are detail views with some parts sectioned on the lines 9—9, 10—10, 11—11 and 12—12 of Fig. 8, respectively;

Fig. 13 is a fragmentary detail view with some parts sectioned on the line 13—13 of Fig. 10;

Fig. 14 is a view corresponding to Fig. 13 with the exception that certain parts have been removed;

Fig. 15 is a perspective view of one of the units of the ejecting mechanism removed from the planter;

Fig. 16 is a perspective view of the plunger;

Fig. 17 is a fragmentary detail view principally in section, taken on the line 17—17 of Fig. 16;

Fig. 18 is a perspective view of the idle sprocket, with its shaft sectioned;

Fig. 19 is a perspective view of the driving sprocket with some parts shown in section;

Fig. 20 is a sectional view taken on the line 20—20 of Fig. 1, on an enlarged scale;

Fig. 21 is a perspective view showing a portion of the potato elevator belt;

Fig. 22 is a fragmentary detail view of the timing sprocket wheel for the elevator, with some parts sectioned on the line 22—22 of Fig. 2, on an enlarged scale;

Fig. 23 is an enlarged fragmentary detail view of the driven sprocket wheel for the potato elevator;

Fig. 24 is a perspective view of the hand control lever and its lock segment;

Fig. 25 is a detail view principally in section taken on the line 25—25 of Fig. 24;

Fig. 26 is a fragmentary perspective view showing a portion of the rear end of the hopper; and Fig. 27 is a detail view partly in side elevation and partly in section taken on the line 27—27 of Fig. 26.

The numeral 30 indicates a horizontal skeleton frame supported at its rear end portion by a pair of relatively large wheels 31 loosely journaled on a fixed axle 32 rigidly secured in bearings on said frame. On the front end of the frame 30 is a pole 33 for attaching the potato planter to a tractor by which said planter may be drawn and at the rear end of said frame is a seat 34 for the operator.

At the front of the planter is a furrow opener 35 comprising a pair of forwardly and upwardly curved diverging shoes rigidly secured to the free end portions of a pair of forwardly projecting arms 36 pivoted to the sides of the frame 30, for vertical swinging movement to raise and lower said furrow opener. The arms 36 at their outer ends are connected to a transverse square rock shaft 37 by a short, wide arm 38, in the form of a flat leaf spring, rigidly secured to said shaft, and a pair of laterally spaced links 39 pivoted to said ends of the arms 36 and to the outer end of the arm 38, see Figs. 3 and 4. This rock shaft 37 is journaled in bearings on the sides of the frame 30 and has on its right-hand end a crank-acting arm 40 connected by a link 41 to a forwardly offset extension 42 on a latch lever 43 by which the rock shaft 37 may be operated to raise or lower the furrow opener 35.

Cooperating with the latch lever 43 to hold the same where set is a fixed notch lock segment 44 on the right side of the frame 30. The latch lever 43 is loosely pivoted to a rock shaft 45 journaled in bearings on the sides of the frame 30 and extends parallel to and rearward of the rock shaft 37. A rearward movement of the latch lever 43, acting through the connections just described, will set the furrow opener 35 to form a furrow X in which seed potatoes Y are dropped by a mechanism hereinafter described. A forward movement of the lever 43 will lift the furrow opener 35 above the ground, as shown by broken lines in Fig. 5. In case the furrow opener 35 strikes a stone, stump or other obstruction, the spring arm 38 will yield and permit said furrow opener to pass over the same.

Following the furrow opener 35 is a pair of covering disks loosely journaled on the free ends of a pair of rearwardly projecting arms 47 rigidly secured to the rock shaft 45 for vertical swinging movement under the rocking action thereof. Also rigidly secured to the shaft 45 is a segment 48 carried by a short arm on said shaft and in the form of a loop in which the lever 43 works. A coiled spring 49 encircling the rock shaft 45 is anchored thereto at one end and its other end, which is relatively long, engages the rear longitudinal edge of the lever 43 and is under strain to swing the same forward. A rearward movement of the lever 43, against the tension of the spring 49, will position the covering disks 46 to fill the furrow X and cover the potatoes therein to the desired depth. In case the covering disks 46 should strike a stone or other obstruction, the spring 49 will yield and permit said disks to raise and pass over the obstruction. A pin 50, inserted through the aligned holes of any one pair of a multiplicity of circumferentially spaced holes in the sides of the segment 48, is arranged to be engaged by the lever 43 during its forward movement and thereby cause the segment 48 to move with said lever, rock the shaft 45 and lift the covering disks 46 into inoperative positions.

Seed potatoes Y, to be planted, are carried in bulk in a hopper 51 supported, above the frame 30 at the rear end portion thereof, by a pair of inverted V-shaped front brackets 52 on the sides of the frame 30, a pair of rear side braces 53 and an intermediate brace 54. The braces 53 are rigidly secured to the sides of the frame 30 and the rear end of the hopper 51 and the intermediate brace 54, which is flat and relatively wide extends at its lower end between the sides of the frame 30 which are in rearwardly converging relation as a spacer and is connected by a U-bolt 55, to a transverse bolt 56 which connects said sides of the frame 30 and clamps the same onto said brace 54, see Figs. 3 and 4. The upper end of the brace 54 is rigidly secured to the back of the hopper 51, see Fig. 26.

The bottom of the hopper 51 is downwardly inclined from its front to its rear end, see Fig. 2, so that the seed potatoes Y therein will roll to the rear end of said hopper as well as the center thereof.

Extending longitudinally through the hopper 51 and forming a section of the bottom thereof at the transverse center, is a channel guide 57 for the endless belt of an elevator, as will hereinafter appear. This channel guide 57 has on its relatively shallow sides forwardly diverging side extensions 58 for causing the seed potatoes Y to roll onto the elevator.

An agitator is provided for working the potatoes toward the rear end of the hopper 51 and includes a pair of parallel bars 59 which work in longitudinal slots in the bottom of the hopper 51, one on each side of the channel guide 57, see Fig. 6. These agitator bars 59 at their front ends are connected to a crank shaft 60 by a pair of cranks 61 set 180° apart and which crank shaft is journaled in bearings on the brackets 52. The rear ends of the agitator bars 59 are suspended by wide links 62 from the rear end of the hopper 51 and which links form closures for apertures in the back of said hopper through which the rear end portions of the agitator bars 59 work, see Fig. 27.

By reference to Fig. 3 is will be noted that the channel guide 57 has a much greater inclination than the bottom of the hopper 51 so that its front end portion is considerably above the agitator bars 59 and its rear end portion is considerably below the bottom of the hopper 51.

Rigidly secured to the back of the hopper 51 at the transverse center thereof is a pair of laterally spaced upright angle bars 63 between which the upper end portions of the intermediate brace 54 extends. These bars 63 extend the full height of the hopper 51 to reinforce the same and their lower end portions extend considerably below said hopper, see Figs. 26 and 27. The seat is carried by a spring bar 64, the lower end portion of which extends between the angle bars 63, terminates at the upper end of the brace 54 and is rigidly secured to the back of the hopper 51.

The elevator for seed potatoes Y in the hopper 51 includes an endless belt 65 comprising hingedly connected flat links having on the outer face of each thereof a fixed sheet metal conical cup 66 for holding a single potato and having a false bottom 67 spaced from the sides thereof, see Fig. 21. This belt 65 runs over a driven or upper sprocket wheel 68 and an idle or lower sprocket wheel 69. The sprocket wheels 68 and 69 are square to fit the flat links of the belt 65, have notched corners to receive the hinge connections between said links. The driven sprocket wheel 68 is V-shaped in cross-section and supports said belt and cups as they pass thereover, as shown in Fig. 20. The sprocket wheel 68 has on each face a pair of teeth 68' which enter notches 65' in the longitudinal edges of each link of the belt 65 to drive the same. The idle sprocket wheel 69 has on each face a pair of retaining lugs 69' for holding the belt 65 against edgewise movement thereon. This idle sprocket wheel 69 works between the depending end portions of the bar 63 and its shaft 70 is rigidly secured by U-bolts to said bars, see Figs. 26 and 27. By reference to Fig. 21 it will be noted the sides of the cups 66 overlying the links of the belt 65 are cut away to afford clearance for the teeth of the sprocket wheel 68 and the retaining lugs of the sprocket wheel 69.

As a tightener for the belt 65 a pair of long eye-bolts 71 are attached to the bolt 56 and the nut-equipped end portions of said bolts extend through bores in the bars 63. By adjusting the nuts on the eye-bolts 71, the bars 63 may be sprung sufficiently to tension the belt 65.

The rear end portion of the elevator belt 65 extends rearward of the hopper 51 and the upper section of said belt, which travels in the direction of the arrow marked on Fig. 3, enters said hopper through an aperture 72 in the rear thereof.

A hood 73 for the idle sprocket 69 and the belt 65 passing therearound, is secured in part to the back of the hopper 51 between the bars 63 and in part to the free end portions of the bars 63, and prevents the escape of potatoes from the hopper 51. During the tensioning of the belt 65 by the eye-bolts 71, the hood 73 moves with the bars 63. On the lower end of each link 62 is a guard 74, which prevents the escape of potatoes from the hopper 51 through the apertures in the back thereof through which the rear ends of the agitator bars 59 work.

Mounted on the frame 30 forward of the brackets 52 is a combined potato cutting and ejecting head which includes an upright body 75 comprising four wide flat radial ribs which form therebetween four circumferentially spaced vertical ways 76 and on the outer vertical edge of each of said ribs is a laterally extended reinforcing flange 77. The lower end of the body 75 is telescoped into an annular supporting base 78, in the form of a ring that is rigidly secured thereto, and which base in turn is rigidly secured to a pair of transverse frame tie members 79, see Figs. 7 and 12. The upper ends of the ribs of the body 75 from the axis thereof are in upwardly diverging relation and are ground sharp to form a cutter 80 having four radial cutting blades for quartering a potato, see Figs. 13 and 14.

Rigidly secured to the top of the body 75 is a casing 81 having an open bottom into which said body extends. In the back of the casing 81 is a trough-like entrance passageway 82 into which potatoes are successively discharged from the elevator to the cutter 80, see Fig. 3. On the top of the casing 81 and spout 82 is an upstanding guard 83 for directing the potatoes from the elevator into said spout where they are precipitated onto the cutter 80 to be quartered thereby.

A centering device 84 for centering a potato on the cutter 80 is provided and comprises four independently hinged plates 85 one in each way 76. These centering plates 85 are in upwardly diverging relation and their upper ends are bifurcated and hinged at 86 to the sides of the casing 81 for opening and closing movements. Coil springs 87, on the pins of the hinges 86, between the prongs of the plates 85, independently and normally hold the centering plates 85 closed and in which positions they are at the edges of the cutter 80 and have substantially the same pitch. When these centering blades 85 are closed their free ends engage the ribs of the body 75 as stops and limit the closing movement of said blades by the springs 87, see Fig. 10.

A reciprocating plunger 88 is provided for forcing a potato, held by the centering device 85, onto the cutter 80 and downward in the ways 76 to quarter the same. This plunger 88 is square in cross-section, works through a correspondingly formed opening 89 in the top of the casing 81 and is held thereby for straight-line reciprocatory movement and from turning about its longitudinal axis. On the top of the plunger 88 is a cross-head 90 which includes a horizontal shaft turnably mounted intermediate of its ends in a bearing on said plunger and having on its ends guide rollers 91 mounted in a pair of diametrically opposite upright channel guides 92 rigidly secured at their lower ends to the sides of the casing 81 and cross-connected above the cross-head 90 by a tie-rod 93.

The lower end of the plunger 88 is bifurcated at 94 to afford clearance for the cutter 80 during its downward movement and to permit the end of the plunger 88 engaging a potato to move past said cutter and thereby completely sever the potato into quarters with one quarter in each way 76.

A sectional holder 95 is provided for holding a potato while the same is being quartered by the cutter 80 and moved in the ways 76 by the plunger 88. This holder 95 includes four depending individual arms 96 one in each way 76 at the transverse center thereof. These arms 96 have wide bifurcated upper ends the prongs of which are loosely pivoted to the pins of the hinges 86 outward of the fixed lugs of said hinges on the casing 81 and support the arms 96 for radial swinging movement in respect to the axis of the body 75. Coiled springs 97 encircling the pins of the hinges 86 adjacent to the springs 87, individually and yieldingly hold the arms 96 pressed toward the axis of the body 75 and onto the bottom of the V-shaped ways 76. These arms 96 are inwardly and downwardly curved intermediate of their ends and their lower or free end portions extend substantially parallel to the axis of the body 75, when in their innermost positions, see Fig. 8, and have on their inner longitudinal edges ratchet-like teeth 98. These teeth 98 are arranged to permit a potato to be forced downward by the plunger 88 between the arms 96 of the holder 95 and which movement of the potato force said arms outward against the tension of their springs 97 but they will not permit the potato to move upward in the ways 76.

Working in each way 76 is an ejector 99 and all of the ejectors 99 are operated in timed relation to successively engage the pieces of potato held by the holder 95 and slide the same downward in the ways 76. The initial downward positive movements imparted to the pieces of potatoes in the ways 76 by the ejectors releases the same from the arms 96 of the holder 95 and discharges the same from said ways where they successively drop into the furrow X a certain predetermined distance apart.

Each ejector 99 includes a horizontally disposed U-shaped follower 100 the prongs of which extend substantially radially toward the axis of the body 75 and have on the inner ends of their prongs a pair of laterally spaced upwardly and outwardly curved arms 101 pivoted at 102 to a long vertical reciprocating slide 103 intermediate of its ends. This slide 103 is upwardly and inwardly inclined in respect to the axis of the body 75 and is mounted in upper and lower bearing lugs 104, the former of which are on the casing 81 and the latter of which are on the base 78. A coiled spring 105 on the pivot 102 for each pair of arms 101 yieldingly holds the follower 100 pressed toward the axis of the body 75 with its transverse portion engaging the slide 103, which extends between said arms, as a stop, see Figs. 7, 8 and 15.

Due to the inclination of the slide 103 they progressively move the followers 100 toward the bottoms of the ways 76 during their upward movement and away from the same during their downward movement.

It will be noted that the respective arm 96 extends between the prongs of the follower 100 when in its uppermost position. During the upward movements of the ejectors 99 their curved arms 101 engage the pieces of potatoes held by the arms 96, ride thereover, and cam the followers 100 outward against the tension of the springs 105 and permit said followers to pass over the pieces of potatoes and above the same. At the time the followers 100 pass above the pieces of potatoes the springs 105 swing said followers inward so that during the downward movements of the ejector their followers 100 will engage the pieces of potatoes, slide the same downward in the ways 76 out of engagement with the arm 96 and close to the bottoms thereof where the momentum thereof precipitates the same into the furrow X.

A pair of notches 88' is formed in each face of the plunger 88 to afford clearance for the arms 96, see Fig. 16.

The driving connections for reciprocating the plunger 88 and operating the elevator and agitators are as follows: A large sprocket wheel 106 is loosely mounted on the axle 32 adjacent to the left hand wheel 31 and is driven therefrom, at will, by a jaw clutch 107. The relatively fixed member of the clutch 107 is mounted on the axle 32 between the hubs of the wheels 31 and 106 and rigidly secured to the wheel 31 for rotation therewith. The relatively movable member of the clutch 107 is mounted on the hub of the sprocket wheel 106 for rotation therewith and with freedom for axial sliding movement therein into and out of interlocking engagement with the fixed member of the clutch 107.

The movable member of the clutch 107 is moved out of interlocking engagement with the fixed member of said clutch by the hand lever 43 through connections which include a chain 108 one end of which is attached to one of the arms of a bell-crank 109 and a transverse link 110 one end of which is pivoted to the other arm of said bell-crank and its other end is attached by a coupling 111 to said movable clutch member. Said bell-crank 109 is pivoted to the right hand bearing for the axle 32, see Fig. 4. The coupling 111 includes an annular fixed flange on the inner end of the movable member of the clutch 107 and a fixed grapple on the adjacent end of the link 110 that has interlocking engagement with said flange for common axial movement therewith but permits rotation thereof with the movable member of the clutch 107. The link 110 adjacent to the coupling 111 is mounted in the bearing 112 on the left hand bearing for the axle 32 with freedom for endwise sliding movement and which bearing 112 acts as a stop that is engaged by the coupling 111 to limit the release of the movable member of the clutch 107 from the fixed member thereof.

A coiled spring 113 anchored to the bearing 112 and attached to the link 110 is under strain to move said link to the left and set the clutch 107. A forward movement of the hand lever 43 acting through the connection just described, will release the clutch 107.

Referring now specifically to the connections for reciprocating the plunger 88, there is provided a sprocket chain 114 which runs over the sprocket wheel 106 and a relatively small sprocket wheel 115 on a stub shaft 116 journaled in a bearing 117 on the cross-tie frame members 79. On the inner end of the stub shaft 116 is a relatively short crank-arm 118 which is pivotally connected to a long depending crank-arm 119 integrally formed with the shaft of the cross-head 90, see Figs. 2 and 7.

The elevator belt 65 is driven by a sprocket chain 120 which runs over a relatively small sprocket wheel 121 on the outer end of the stub shaft 116 and a relatively large timing sprocket wheel 122 keyed to the left hand end of the shaft 123 of the sprocket wheel 68, see Fig. 1.

The crank shaft 60 for the agitator bars 59 is rotated from the sprocket chain 114 by a sprocket wheel 124 on the left hand end of said crank shaft, and under which said chain runs, see Figs. 1 and 2.

By reference to Fig. 22 it will be noted, that the timing sprocket wheel 122 may be circumferentially adjusted about the axis of its shaft 60 to time the elevator belt 65 in respect to the plunger 88 so that when said plunger is in its raised position a potato from one of the cups 66 of the elevator will be discharged therefrom onto the cutter 80 to be pressed by the plunger 88 onto said cutter and quartered thereby during the downward movement of said plunger.

The four ejectors 99 are successively operated in timed relation to each other and the plunger 88 to successively and positively remove the pieces of a quartered potato from the holder 95 before the next following potato is cut. For thus operating the ejectors 99 there is provided a pair of horizontally disposed levers 125 which extend longitudinally of the planter, one on each side of the casing 81 and intermediately pivoted of their ends thereto. On each end of each lever 125 is a depending link 126 and the four links 126 are connected one to each slide 103 by a short horizontal arm 127 rigidly secured to said slide just above its pivot 102, see Figs. 7 and 8. To intermittently rock these levers 125 in timed relation to each other and the plunger 88, there is formed on the front end of each thereof a long cam finger 128 and a short cam finger 129 vertically spaced apart. By reference to Fig. 7, it will be noted that the fingers 128—129 on one lever 125 are reversely arranged from the fingers on the other lever.

Cooperating with the fingers 128—129 of each pair is an upper cam pin 130 and a lower cam pin 131. Each pair of cam pins 130—131 is carried on one of the depending prongs of a large yoke 132 and which pins project horizontally inward from the inner face of the prong to which they are rigidly secured. By reference to Fig. 7, it will be noted that the cam pins 130—131 of one pair are at different elevations from the cam pins of the other pair and that the distance between the two cam pins of each pair is different.

The yoke 132 is rigidly secured at its transverse portion to the upper end of the plunger 88 by a forwardly projecting plate 133 for common reciprocatory movement therewith. The arrangement of the cam fingers and cooperating cam pins is such that two of the ejectors 99 are actuated during the downward stroke of the plunger 88 and the other two thereof are actuated during the upward stroke of said plunger and in timed relation so that the four pieces of cut potato are ejected one at a time before the next potato is cut.

From the above description, it is evident that the single hand lever 43 is operable to release the spring set clutch 107, raise and lower the furrow opener 35 and covering disks 46. When the hand lever 43 is in its foremost position, as indicated by broken lines in Fig. 5, the furrow opener 35 and covering disk 46 are in inoperative positions and the chain 108 is taut thereby holding the clutch 107 released against the tension of the spring 113. During a rearward movement of the hand lever 43 the furrow opener 35 and covering disk 46 are moved into operative positions and slack is produced in the chain 108 to permit the spring 113 to set the clutch 107 and start the driving connections for the elevator, agitators, plunger and ejectors.

The positively driven mechanism above described, for operating the elevator, plunger and ejectors from the traction wheel of the planter, is timed in respect to the travel thereof so that the seed potatoes are successively delivered to the cutting mechanism and the cut pieces thereof successively ejected from the planter into the furrow. By thus automatically controlling the cutting of the potatoes and ejecting the pieces thereof in timed relation to the lineal travel of the planter said planter may be drawn at a relatively fast speed by a tractor without cutting more than one potato at a time successively ejecting the pieces thereof after the next potato is cut.

The passageways between the false bottoms and the sides of the cups 66 in the under sides of said cups below their false bottoms 67 permits the escape of dirt from the cups 66 and makes the same self cleaning.

What I claim is:

1. In a planter of the class described, a body having cutting edges and ways leading therefrom, a reciprocatory plunger for forcing a potato onto the cutting edges and into the ways, a holder including an individual yieldingly held arm in each way for holding a potato while the same is being cut and the pieces thereof after being cut, ejector mechanism operated in timed relation with the plunger for successively removing the pieces of a potato from the holder and moving the same in the ways, and power-actuated mechanism for reciprocating the plunger and operating the elevator and ejector.

2. In a planter of the class described, a body having cutting edges and ways leading therefrom, a reciprocatory plunger for forcing a potato onto the cutting edges and into the ways, a holder including an individual yieldingly held arm in each way for holding a potato while the same is being cut and the pieces thereof after being cut, ejector mechanism including a yieldingly held reciprocatory follower in each way arranged to ride over a piece of potato in the way during its retracting movement and slide said piece in the way during its projecting movement, said followers being timed to successively slide the pieces of potatoes in the ways where they are precipitated therefrom, and power-actuated mechanism for reciprocating the plunger and operating the elevator.

3. In a planter of the class described, a body having cutting edges and ways leading therefrom, a reciprocatory plunger for forcing a potato onto the cutting edges and into the ways, a holder including an individual yieldingly held arm in each way for holding a potato while the same is being cut and the pieces thereof after being cut, ejector mechanism including for each way a slide mounted for reciprocatory movement longitudinally of the way, a follower on the slide yieldingly held to ride over a piece of potato in the way and held by its holder, and connections actuated by the plunger for operating the slides in timed relation to successively slide the pieces of potato in the ways to release the same from the holder and cause the pieces to be precipitated from the ways, and power-actuated mechanism for reciprocating the plunger and operating the elevator.

4. The structure defined in claim 3 in which the slides are oblique to the ways whereby, the followers move toward the ways during their retracting movements and away from the same during their projecting movements.

5. The structure defined in claim 1 in which the arms have ratchet-like teeth constructed and arranged to hold the pieces of potatoes with freedom for movement by the ejector.

In testimony whereof I affix my signature.

PEDER ISRAELSON.